(12) United States Patent
Terada et al.

(10) Patent No.: US 7,726,868 B2
(45) Date of Patent: Jun. 1, 2010

(54) SPREAD ILLUMINATING APPARATUS, TRANSPARENT RESIN PLATE FOR USE IN SPREAD ILLUMINATING APPARATUS, AND METHOD OF INJECTION-MOLDING TRANSPARENT RESIN PLATE

(75) Inventors: Naoyuki Terada, Kitasaku-gun (JP); Motoji Egawa, Kitasaku-gun (JP); Akinobu Sano, Kitasaku-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 176 days.

(21) Appl. No.: 12/153,882

(22) Filed: May 27, 2008

(65) Prior Publication Data
US 2008/0316772 A1 Dec. 25, 2008

(30) Foreign Application Priority Data
Jun. 22, 2007 (JP) .............................. 2007-165264

(51) Int. Cl.
*F21V 7/04* (2006.01)
(52) U.S. Cl. ........................ 362/633; 362/634; 362/623; 362/606
(58) Field of Classification Search ................. 362/633, 362/634, 615, 606
See application file for complete search history.

(56) References Cited
U.S. PATENT DOCUMENTS 7,106,393 B2 * 9/2006 Lee .............................. 349/58
7,372,515 B2 * 5/2008 Lee et al. ..................... 349/58
7,641,375 B2 * 1/2010 Fujita et al. ................. 362/617
2008/0088764 A1 * 4/2008 Son et al. ..................... 349/58

FOREIGN PATENT DOCUMENTS

| JP | A 506837 | 7/1997 |
|----|----------|--------|
| JP | A 2005-302485 | 10/2005 |
| JP | A 2006-285171 | 10/2006 |

* cited by examiner

Primary Examiner—Sandra L O'Shea
Assistant Examiner—Evan Dzierzynski
(74) Attorney, Agent, or Firm—Oliff & Berridge, PLC

(57) ABSTRACT

A spread illuminating apparatus of side light type includes a transparent resin plate integrally composed of a light conductor plate portion and a housing frame portion, a light reflecting sheet, and a light source, wherein an opening for housing the light source is provided at a side portion of the transparent resin plate, slits are provided along a boundary between the light conductor plate portion and the housing frame portion, and wherein a gate for injecting resin into a molding die cavity for the transparent resin plate is positioned outside the boundary of the light conductor plate portion and the housing frame portion and is positioned also between the opening and one of slits which are provided toward the side portion of the transparent resin plate having the opening and which are located clear of the opening.

9 Claims, 8 Drawing Sheets

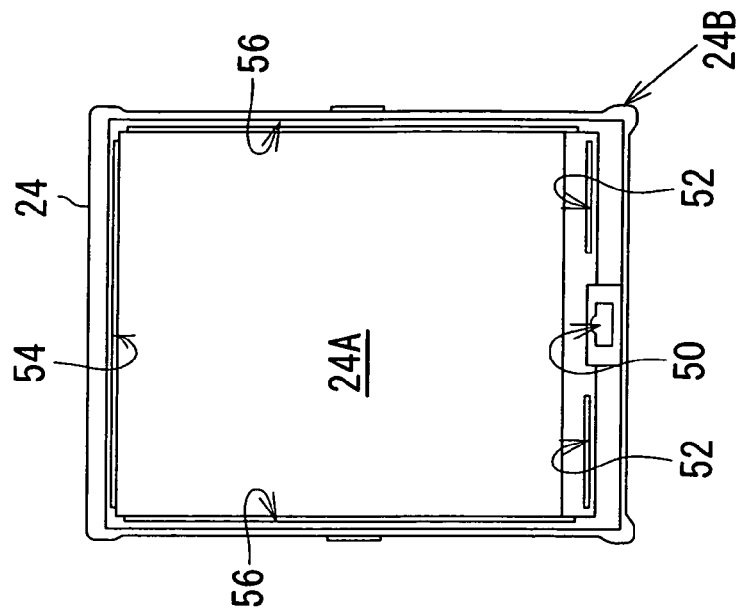
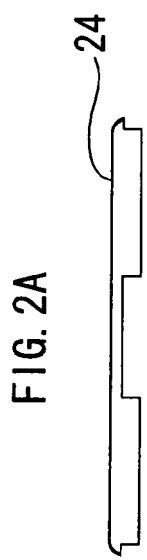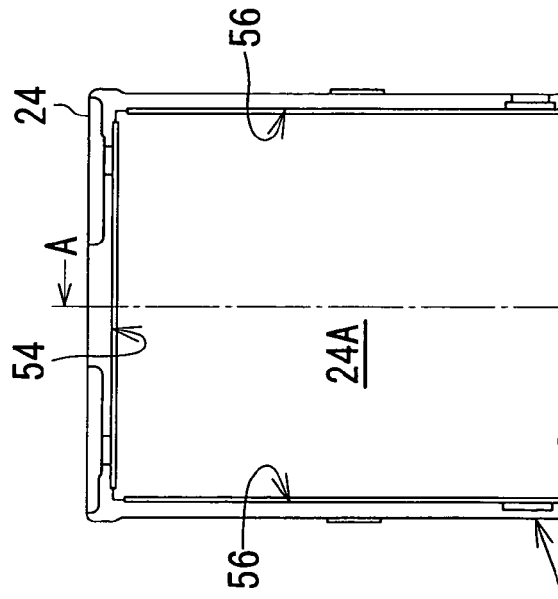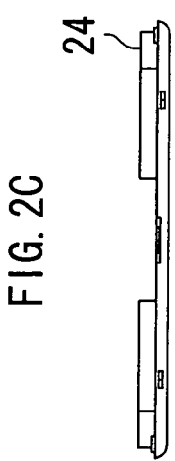

SPREAD ILLUMINATING APPARATUS, TRANSPARENT RESIN PLATE FOR USE IN SPREAD ILLUMINATING APPARATUS, AND METHOD OF INJECTION-MOLDING TRANSPARENT RESIN PLATE

BACKGROUND OF THE INVENTION

1. Field of the Invention

The present invention relates to a spread illuminating apparatus of side light type, particularly a spread illuminating apparatus including a transparent resin plate integrally composed of a light conductor plate portion and a housing frame portion, to a transparent resin plate for use in a spread illuminating apparatus, and further to a method of injection-molding such a transparent resin plate.

2. Description of the Related Art

A liquid crystal display (LCD) device is characterized by a small thickness, a small occupation volume, a light weight and the like and is used extensively in various electric products, such as a mobile telephone and a personal computer.

Since a liquid crystal in the LCD device does not emit light by itself, an illuminating means is required when the LCD device is used at a place where a solar light or an illumination light is not fully available.

While the LCD device is requested to be further downsized, its display area is requested to be enlarged. In order to satisfy such requests at one time, the ineffective portion of a lighting means must be reduced, and also its power consumption is desired to be lowered, which is achieved by efficiently utilizing light from a light source.

Under the circumstance where downsizing and power consumption reduction are requested, a point light source such as a light emitting diode (LED) is used as a light source for an illuminating means, and also constituent members of an illuminating means, such as a light source, a light conductor plate and the like are positioned in place to efficiently utilize light emitted from the light source.

FIG. 9 shows a relevant portion of a conventional spread illuminating apparatus in which a rectangular light conductor plate 1 and LEDs 2, 2 disposed at a side surface 8 of the light conductor plate 1 are disposed in place inside a housing frame 7 made of a white resin. Protrusions 12a and 12c are provided at each of side surfaces 11 and 12 of the light conductor plate 1 orthogonal to the side surface 8 having the LEDs 2, 2, and recesses 20a and 20c are provided at each of two inner side surfaces of the housing frame 7 opposing the side surfaces 11 and 12 of the light conductor plate 1, wherein the light conductor plate 1 is firmly held in place inside the housing frame 7 such that the protrusions 12a and 12c of the light conductor plate 12 engage respectively with the recesses 20a and 20c of the housing frame 7 (refer, for example, to Japanese Patent Application Laid-Open No. 2005-302485).

In the engagement structure described above, however, a predetermined gap is required between the side surface 11/12 of the light conductor plate 1 and the inner side surface of the housing frame 7, and light loss attributable to the gap must be made up for by some measures. The white resin of the housing frame 7 has a smaller reflectance than a reflection film to constitute a light reflecting sheet, such as an enhanced specular reflector (ESR) (refer, for example, to Japanese Patent Application published under No. H9-506837), and some action must be taken to make up for light loss attributable to this low reflectance.

When the apparatus described above is further reduced in thickness, its entire rigidity becomes insufficient, and also it is likely to happen that the protrusions 12a and 12c of the light conductor plate 1 disengage from the recesses 20a and 20c of the housing frame 7. FIG. 10 shows another conventional spread illuminating apparatus adapted to achieve a sufficient mechanical strength in the downsizing effort, which has an integrated structure of a light conductor plate portion 421 and a housing frame portion 422, where a pattern 426 is formed at a predetermined distance from light sources 410, 410 (refer, for example, to Japanese Patent Application Laid-Open No. 2006-285171).

In the integrated structure described above, however, the housing frame portion 422 is to be made of a resin material of which the light conductor plate portion 421 is also made and which has a high optical transmittance, and therefore light is caused to leak from the housing frame portion 422. In consideration of the light leakage problem, grooves 425 are provided at portions of the light conductor plate portion 421 located close to the housing frame portion 422, and light emitted from the light source 410 and traveling in the light conductor plate portion 421 is totally reflected by the grooves 425.

Since polycarbonate or polymethylmethacrylate that is a common resin material for a light conductor plate has a refractive index of about 1.5 and has a relatively large critical angle, it may potentially happen that lots of lights emitted from the light source 410 and traveling in the light conductor plate impinge on the grooves 425 at an angle smaller than the critical angle of the resin material depending on the design of constituent members, and that the grooves 425 fail to adequately prevent the lights from leaking thus causing light loss.

Also, for preventing light leakage from the housing frame portion 422, a reflective film must be fixedly attached to the outer side surfaces of the housing frame portion 422 by some kind of method, and, for example, if a double face tape is used for fixed attachment, light is absorbed by the adhesive layers of the double face tape. Even if the reflective film can be fixedly attached without using a double face tape, light is inevitably absorbed and lost to some extent while traveling in the housing frame portion 422.

Further, when such the integrated structure (resin plate) as described above is made by injection molding, in view of a gate cutting process, an injection gate for filling resin in a molding die cavity is usually disposed at a portion of the molding die corresponding to an end of the housing frame portion 422 opposite to an end having the light sources 410, 410. In this case, the resin injected in the molding die cavity through the injection gate is caused to flow into a cavity segment for the light conductor plate portion 421 through paths each provided between adjacent two grooves 425 thus generating a plurality of resin flows which meet and interfere with one another inside the cavity segment thereby forming what are called "weld lines", and adverse effects are caused on the optical properties of the light conductor plate portion 421 thus formed.

SUMMARY OF THE INVENTION

The present invention has been made in light of the problems described above, and it is an object of the present invention to provide a spread illuminating apparatus of side light type in which a light conductor plate and a housing frame are combined into an integrated structure thereby maintaining a sufficient mechanical strength and also preventing light from leaking from a housing frame portion of the integrated structure while downsizing of the apparatus is achieved, and in which weld lines are prevented from occurring in a portion of a light conductor plate of the integrated structure when the integrated structure is formed by injection molding whereby the integrated structure has enhanced optical properties.

According to a first aspect of the present invention, there is provided a spread illuminating apparatus of side light type which includes: a transparent resin plate integrally composed of a light conductor plate portion and a housing frame portion; a light reflecting sheet disposed at the rear of the transparent resin plate; and a light source disposed at a side of the transparent resin plate, wherein: the light reflecting sheet includes a main body portion and flap portions extending from sides of the main body portion and bent up along the sides; an opening for housing the light source is provided at a side portion of the transparent resin plate; slits are provided along a boundary between the light conductor plate portion and the housing frame portion of the transparent resin plate; and the light reflecting sheet is attached to the transparent resin plate with the flap portions inserted in the slits of the transparent resin plate, and in the spread illuminating apparatus described above, a gate for injecting resin for the transparent resin plate is positioned outside the boundary between the light conductor plate portion and the housing frame portion and is positioned also between the opening and one of slits which are provided toward the side portion of the transparent resin plate having the opening and which are located clear of the opening.

In the first aspect of the present invention, a distance defined from the opening to the one slit provided toward the side portion of the transparent resin plate having the opening may be larger than a distance defined from the boundary with the one slit to an outer side surface of the side portion of the transparent resin plate having the opening.

In the first aspect of the present invention, the opening may be located either at the center of the length of the side portion of the transparent resin plate having the one slit or in the vicinity of the center.

According to a second aspect of the present invention, there is provided a transparent resin plate which is integrally composed of a light conductor plate portion and a housing frame portion, and which is adapted for use in a spread illuminating apparatus of side light type including a light reflecting sheet disposed at the rear of the transparent resin plate and a light source disposed at a side of the transparent resin plate, wherein: the light reflecting sheet comprises a main body portion and flap portions extending from sides of the main body portion and bent up along the sides; an opening for housing the light source is provided at a side portion of the transparent resin plate; slits are provided along a boundary between the light conductor plate portion and the housing frame portion of the transparent resin plate; and the light reflecting sheet is attached to the transparent resin plate with the flap portions inserted in the slits of the transparent resin plate, and in the transparent resin plate described above, a gate for injecting resin for the transparent resin plate is positioned outside the boundary between the light conductor plate portion and the housing frame portion and is positioned also between the opening and one of slits which are provided toward the side portion of the transparent resin plate having the opening and which are located clear of the opening.

In the second aspect of the present invention, a distance defined from the opening to the one slit provided toward the side portion having the opening may be larger than a distance defined from the boundary with the one slit to an outer side surface of the side portion of the transparent resin plate having the opening.

In the second aspect of the present invention, the opening may be located either at the center of the length of side portion of the housing frame portion having the one slit or in the vicinity of the center.

According to a third aspect of the present invention, there is provided a method of injection-molding a transparent resin plate which is integrally composed of a light conductor plate portion and a housing frame portion and which is adapted for use in a spread illuminating apparatus of side light type including a light reflecting sheet disposed at a rear of the transparent resin plate and a light source disposed at a side of the transparent resin plate, wherein: the light reflecting sheet includes a main body portion and flap portions extending from sides of the main body portion and bent up along the sides; an opening for housing the light source is provided at a side portion of the transparent resin plate; slits are provided along a boundary between the light conductor plate portion and the housing frame portion of the transparent resin plate; and the light reflecting sheet is attached to the transparent resin plate with the flap portions inserted in the slits of the transparent resin plate, and the method described above includes a step of injecting resin for the transparent resin plate into a cavity of a molding die through a gate which is positioned outside the boundary between the light conductor plate portion and the housing frame portion and is positioned also between the opening and one of slits which are provided toward the side portion of the transparent resin plate having the opening and which are located clear of the opening.

In the third aspect of the present invention, a distance defined from the opening to the one slit provided toward the side portion having the opening may be larger than a distance defined from the boundary with the one slit to an outer side surface of the side portion of the transparent resin plate having the opening.

In the third aspect of the present invention, the opening may be located either at the center of the length of the side portion of the transparent resin plate having the one slit or in the vicinity of the center.

Accordingly, in the spread illuminating apparatus of side light type described above, a light conductor plate and a housing frame are combined into an integrated structure thereby maintaining a sufficient mechanical strength and also preventing light from leaking from a housing frame portion of the integrated structure while downsizing of the apparatus is achieved, and weld lines are prevented from occurring in a portion of a light conductor plate of the integrated structure when the integrated structure is formed by injection molding whereby the integrated structure has enhanced optical properties.

BRIEF DESCRIPTION OF THE DRAWINGS

FIG. 2A is a front side view of a transparent resin plate of the spread illuminating apparatus of FIG. 1;

FIG. 2B is a top plan view of the transparent resin plate of FIG. 2A;

FIG. 2C is a rear side view of the transparent resin plate of FIG. 2A;

FIG. 2D is a right side view of the transparent resin plate of FIG. 2A

FIG. 2E is a bottom plan view of the transparent resin plate of FIG. 2A;

DETAILED DESCRIPTION OF THE INVENTION

An exemplary embodiment of the present invention will be described with reference to the accompanying drawings.

Figure 1:
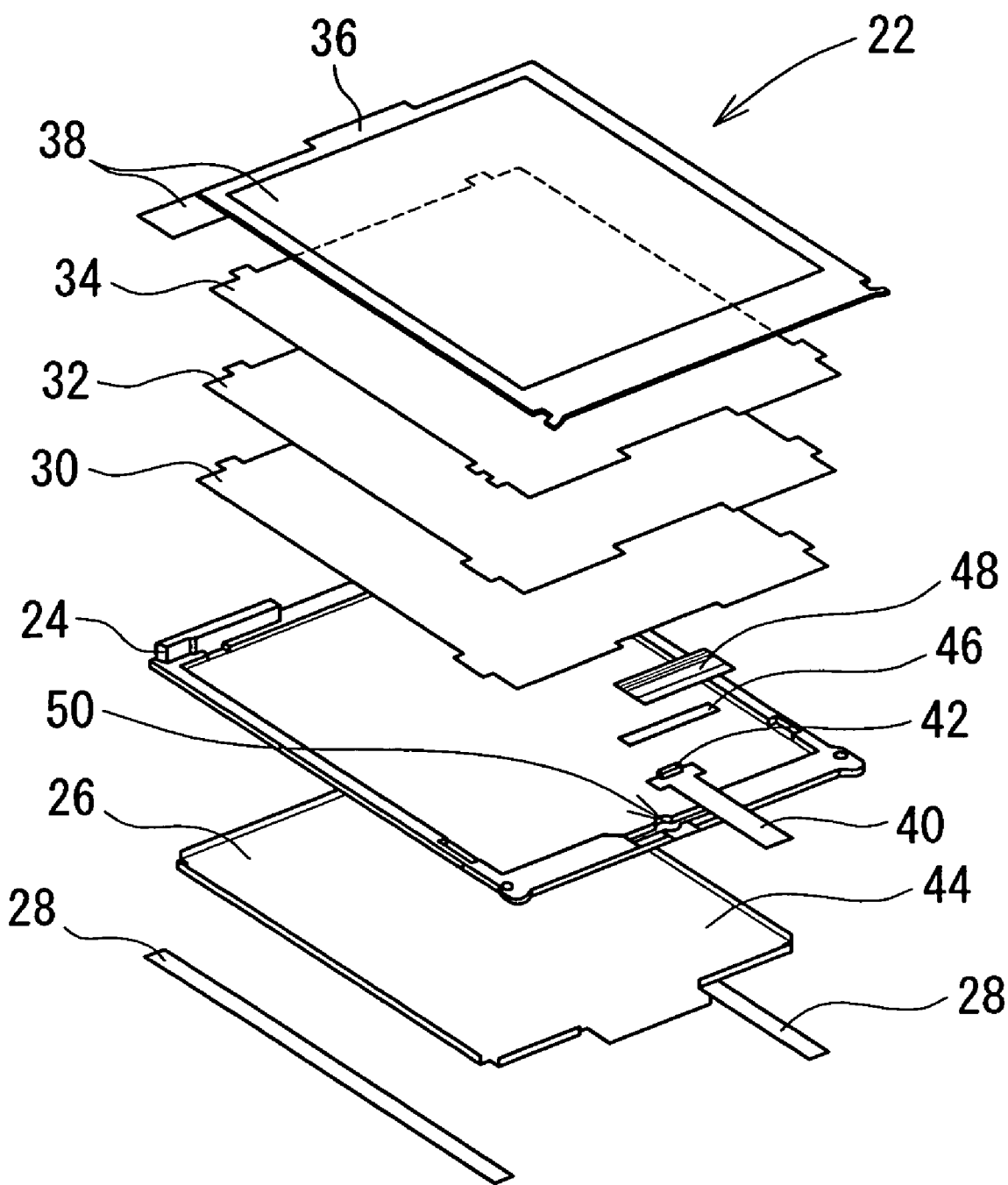
FIG. 1 is an exploded perspective view of a spread illuminating apparatus according to an embodiment of the present invention.

Referring to FIG. 1, a spread illuminating apparatus 22 according to an embodiment of the present invention principally includes a transparent resin plate 24, a light reflecting sheet 26 disposed at the rear of the transparent resin plate 24. The light reflecting sheet 26 is flexibly fixed to the transparent resin plate 24 by adhesive tapes 28 as a fixing means. The spread illuminating apparatus 22 further includes a light diffusing sheet 30, prism sheets 32 and 34, and a light shielding sheet 38 superposed in this order on the front of the transparent resin plate 24. In this connection, a protection film 38 which is put on the light shielding sheet 36 for protection purpose is to be peeled off when a liquid crystal panel is attached.

The transparent resin plate 24 includes a through opening 50 (to be described later) to firmly house an LED 42 (as a light source) mounted on a flexible printed circuit (FPC) 40. The LED 42 has a reflector 44 disposed at its rear and a reflector 46 at its front, and a black spacer 48 is put over the reflector 46 as a measure to prevent or suppress brightness non-uniformity at an area near the LED 42.

Referring to FIGS. 2A to 2B, the transparent resin plate 24 in the present embodiment is made of polycarbonate or polymethylmethacrylate such that a light conductor plate portion 24A and a housing frame portion 24B are integrated with each other. The aforementioned opening 50 to firmly house the LED 42 is formed at a side portion of the transparent resin plate 24 positioned inside the outer side surface.

Figure 3:
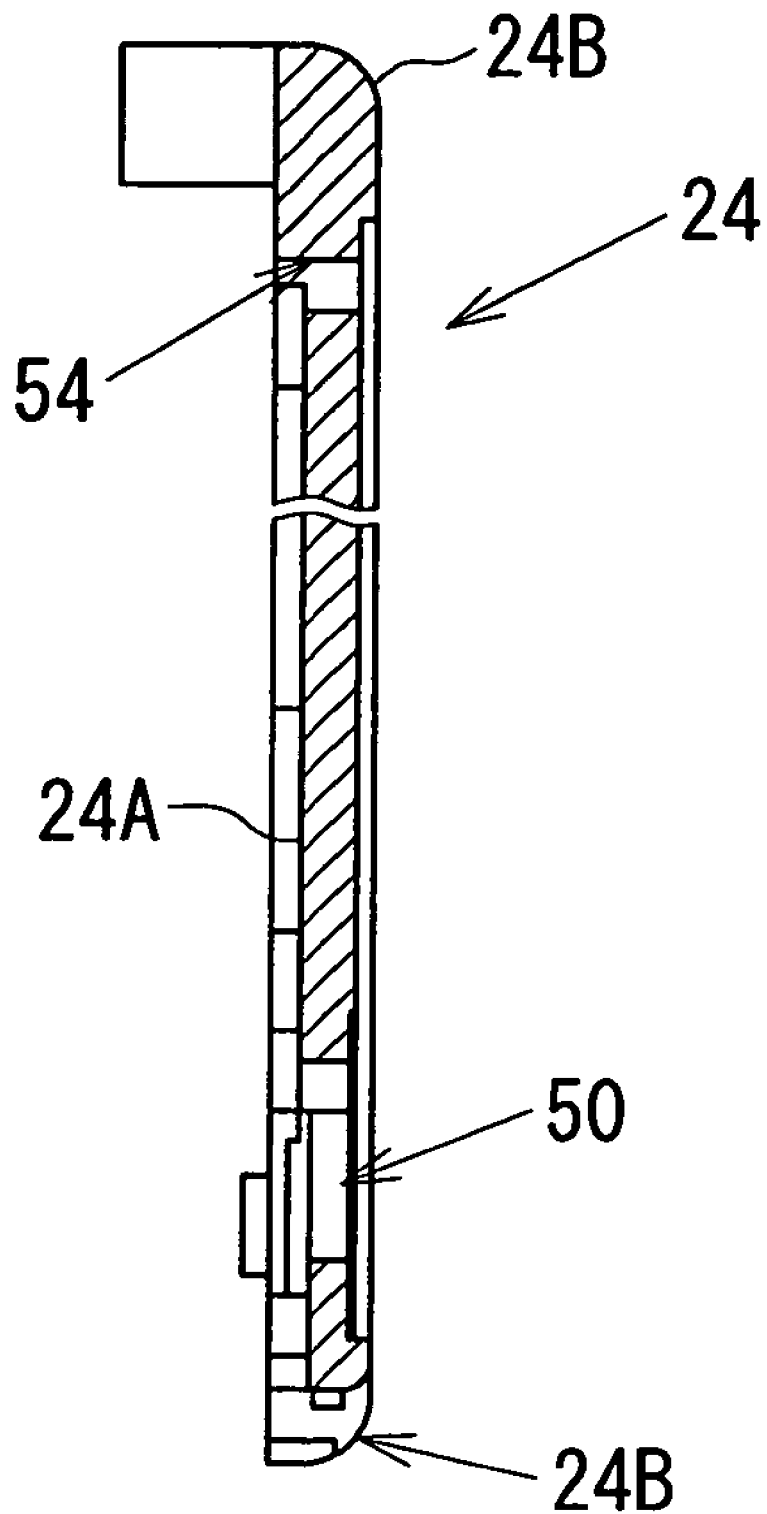
FIG. 3 is a schematic cross sectional view of FIG. 2B taken along line A-A.

Referring to FIG. 3, the light conductor plate portion 24A has, at the rear thereof, a recess for receiving the light reflecting sheet 26 and, at the front thereof, a recess for receiving the light diffusing sheet 30 and the prism sheets 32 and 34, thus the light conductor plate portion 24A has a lower profile than the housing frame portion 24B.

Figure 4A:
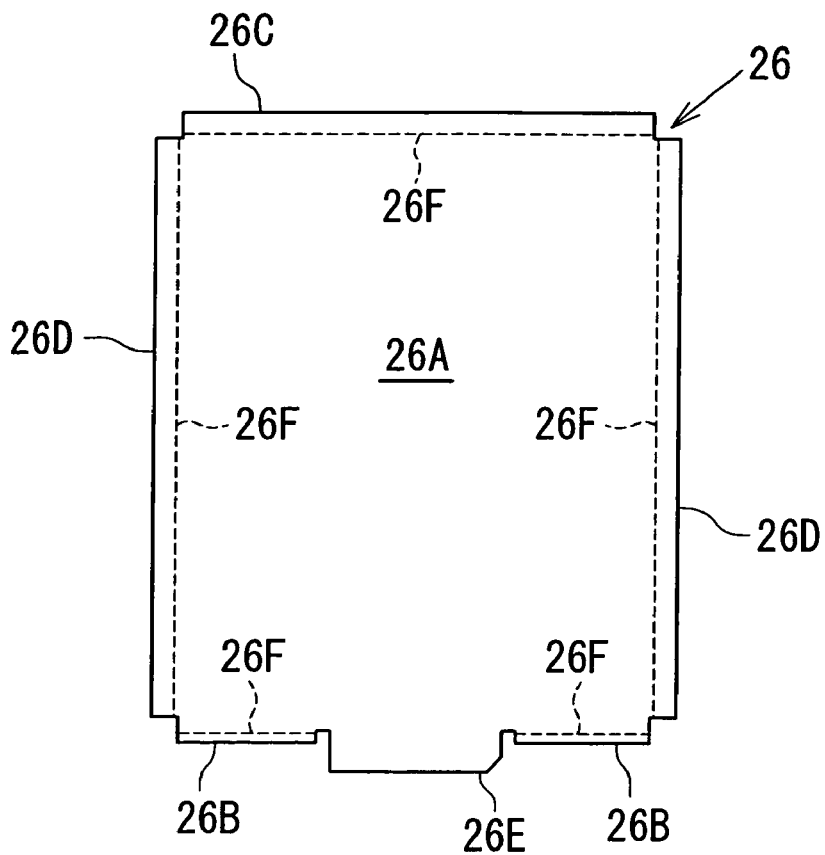
FIG. 4A is a development plan view of a light reflecting sheet of the spread illuminating apparatus of FIG. 1.
Figure 4B:
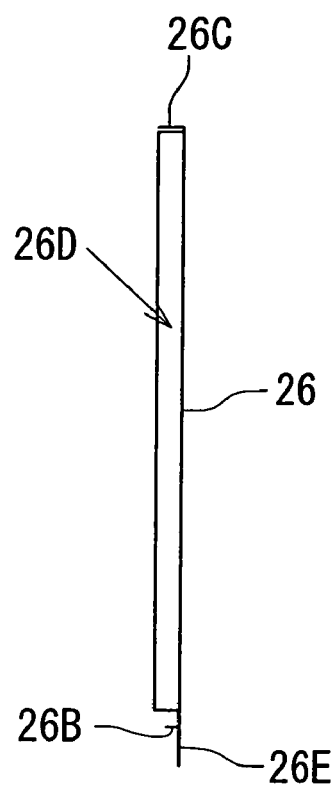
FIG. 4B is a side view of the light reflecting sheet of FIG. 4A with their flap portions folded.

Referring to FIGS. 4A and 4B, the light reflecting sheet 26 is an ESR film having a thickness of 0.065 mm and includes a rectangular main body portion 26A and flap portions 26B, 26B, 26C, 26D and 26D integrally disposed at sides 26F of the main body portion 26A and bent up along the sides 26F (fold lines 26F) of the main body portion 26A, wherein the flap portions 26B, 26B are disposed toward the side of the transparent resin plate 24 having the opening 50, the flap portion 26C is disposed toward the side opposite to the side having the opening 50, and wherein the flap portions 26D, 26D are disposed toward the respective sides orthogonal to the side having the opening 50. The light reflecting sheet 26 further includes a protrusion 26E which extends from the side of the main body portion 26A having the flap portions 26B, 26B and which covers the rear of the opening 50.

The transparent resin plate 24 includes slits 52, 52, 54, 56 and 56 disposed inside and close to the outer side surfaces thereof, specifically disposed along a boundary between the light conductor plate portion 24A and the housing frame portion 24B, so as to correspond respectively to the fold lines 26F for the flap portions 26B, 26B, 26C, 26D and 26D as shown in FIGS. 2B and 2E. The flap portions 26B, 26B, 26C, 26D and 26D bent up of the light reflecting sheet 26 are inserted respectively in the slits 52, 52, 54, 56 and 56 as shown in FIG. 5 (only 26D, 26D and 56, 56 are shown in the figure).

Figure 5:
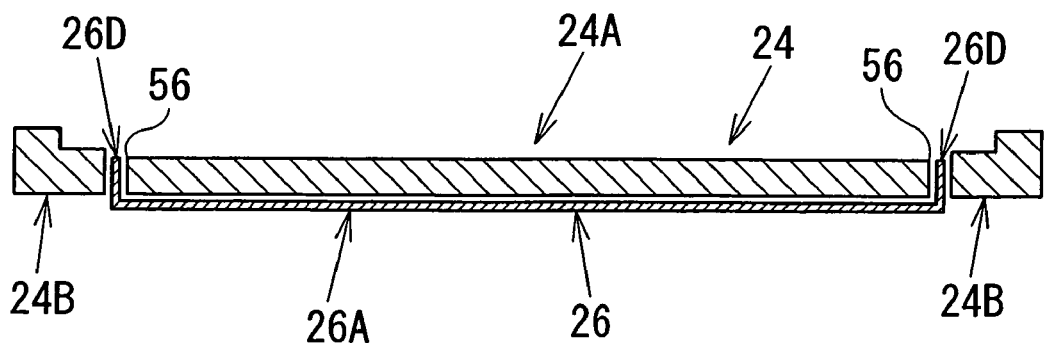
FIG. 5 is a schematic cross sectional view of the spread illuminating apparatus of FIG. 1.
Figure 6A:
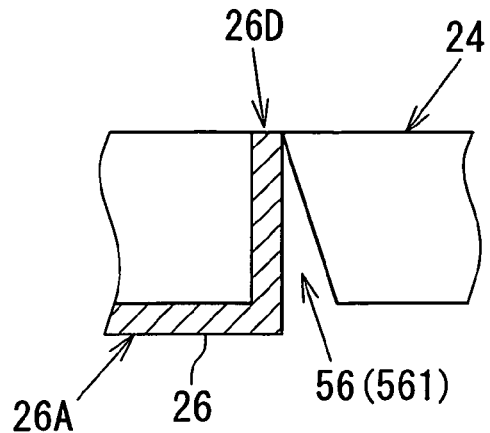
FIGS. 6A, 6B and 6C are schematic cross sectional views of slit configuration variations in the transparent resin plate.
Figure 6B:
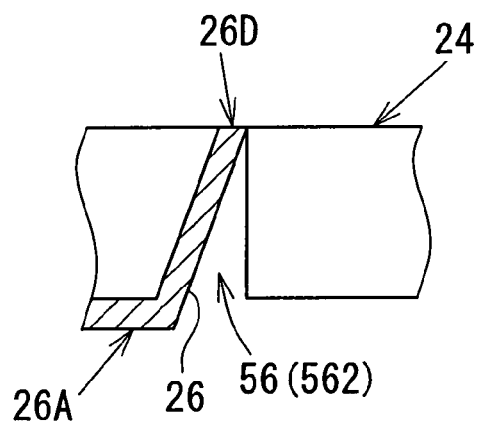
Figure 6C:
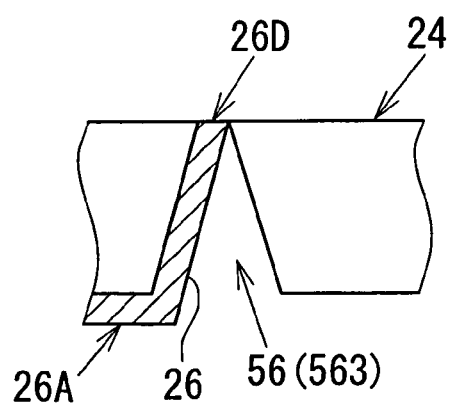

Referring to FIG. 5, the slits 52, 52, 54, 56 and 56 have a constant width from the front to the rear (only the slits 56, 56 are shown in the figure), but may have a smaller width at the front than at the rear as shown in FIGS. 6A to 6C, wherein one slit wall is tilted with respect to the front or rear surface of the transparent resin plate 24 in FIGS. 6A and 6B, and two slit walls are tilted in FIG. 6C.

In the case of FIGS. 6B and 6C, the bending angle of the flap portion 26D may be originally set corresponding to the tilt angle of the slit wall, or may be originally set at right angle to the front or rear surface of the main body portion 26A and then resiliently increased to the tilt angle while the flap portion 26D is pressed against the slit wall. Also, the slit wall does not have to be straight in cross section as shown in FIGS. 6A to 6C but may alternatively be curved.

The flap portions 26B, 26B, 26C, 26D and 26D of the light reflecting sheet 26 and the slits 52, 52, 54, 56 and 56 of the transparent resin plate 24 do not necessarily have to be oriented parallel to the outer side surfaces of the transparent resin plate 24 in cross section but may be appropriately arranged in consideration of crystal panel shape, brightness distribution and the like. Also, the flap portions 26B, 26B, 26C, 26D and 26D and also the protrusion 26E do not have to be formed integrally with the main body portion 26A but may alternatively be formed discretely therefrom.

The spread illuminating apparatus 22 includes only one opening 50 but may include two or more of the openings 50 each housing one LED 42 therein.

Figure 7A:
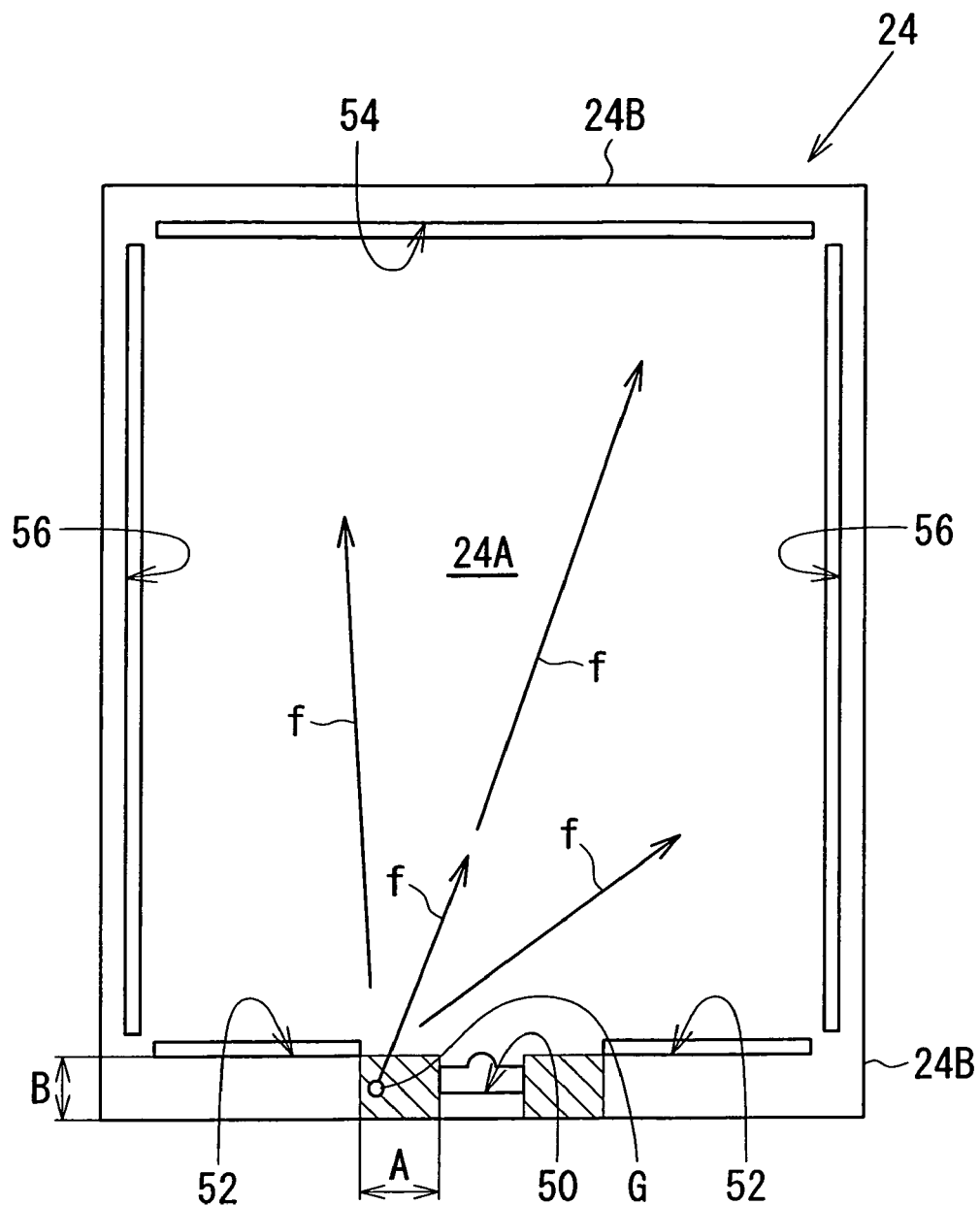
FIG. 7A is a schematic top plan view of the transparent resin plate of the spread illuminating apparatus of FIG. 1, showing resin flows when the transparent resin plate is injection-molded.
Figure 7B:
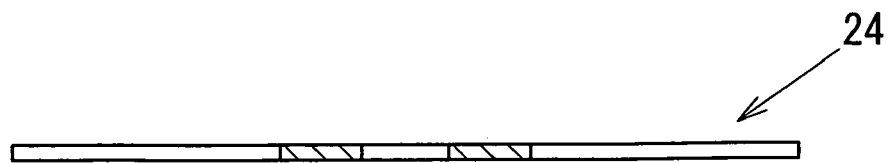
FIG. 7B is a front side view of FIG. 7A.

Referring to FIG. 7A, a gate G for injecting resin is disposed at an area positioned at the side portion of the transparent resin plate 24 having the opening 50 to house the LED 42. More specifically, the gate G is positioned outside a line aligned to the slits 52, 52 of the transparent resin plate 24, that is, outside the boundary between the light conductor portion 24A and the housing frame portion 24B, and is positioned also between one slit 52 and the opening 50. The area to have the gate G disposed thereat is divided into two zones indicated by hatching and each involving front, rear and side surfaces as shown in FIGS. 7A and 7B, and the gate G is to be disposed in one of the two zones.

In the spread illuminating apparatus 22 described above according to the embodiment of the present invention, the following advantages can be achieved.

Referring to FIG. 7A, the gate G is positioned between the opening 50 and the slit 52 and outside the boundary between the light conductor plate portion 24A and the housing frame portion 24B of the transparent resin plate 24, and when resin is injected into a molding die cavity for the transparent resin plate 24 through the gate G disposed as described above, a plurality of resin flows f are generated to run straight (see arrows in the figure) into the cavity segment for the light conductor plate portion 24A through the area between the opening 50 and the slit 52 without interfering with one another, thus preventing generation of weld lines therein.

Also, since the gate G is positioned at one of the zones (indicated by hatching in FIGS. 7A and 7B) which are clear of the light conductor plate portion 24A of the transparent resin plate 24, light emitted from the LED 42 is not adversely effected by the cut trace of the gate G.

Figure 8:
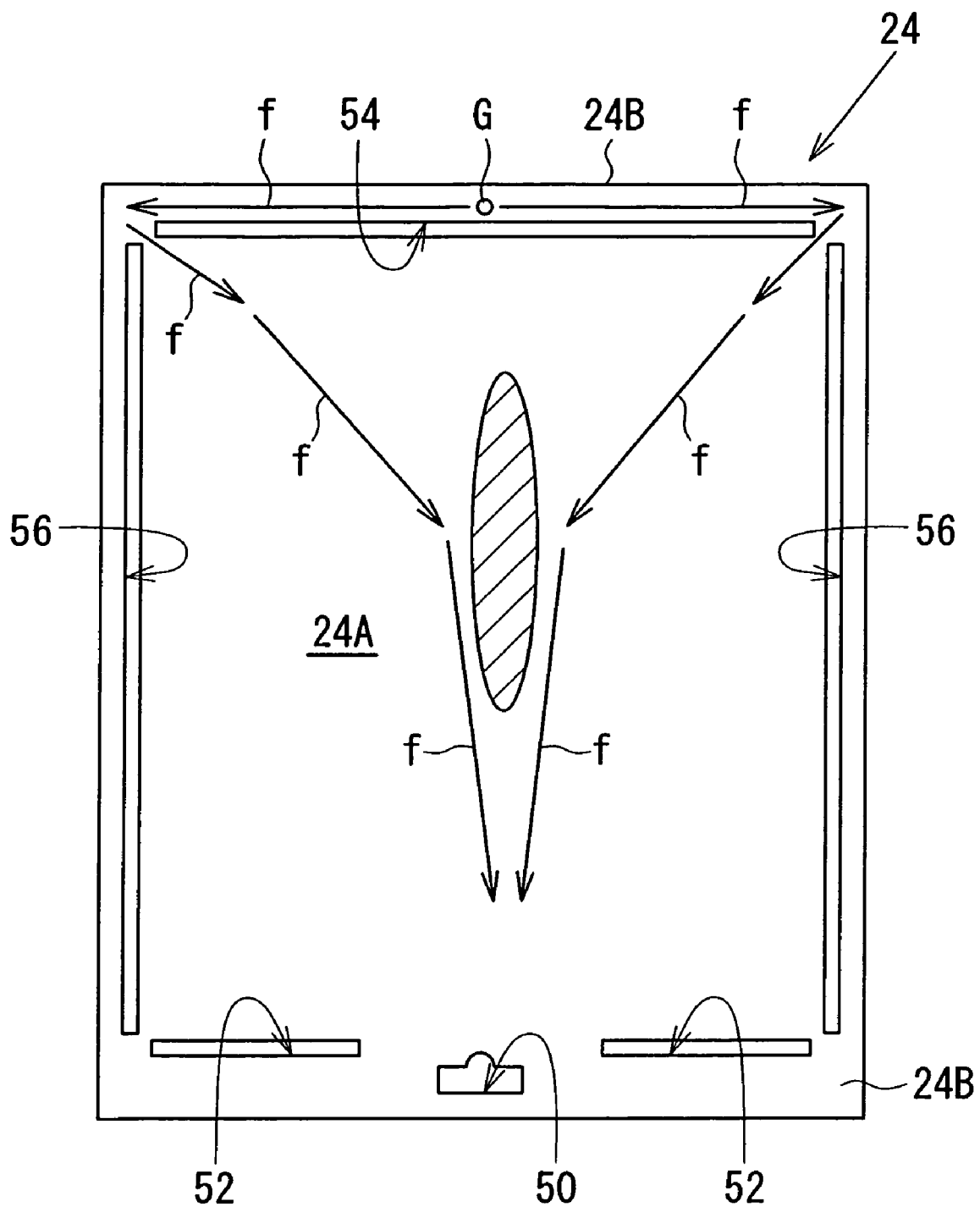
FIG. 8 is a schematic top plan view, as reference, of an equivalent transparent resin plate with a gate located at an opposite side, showing resin flows.
Figure 9:
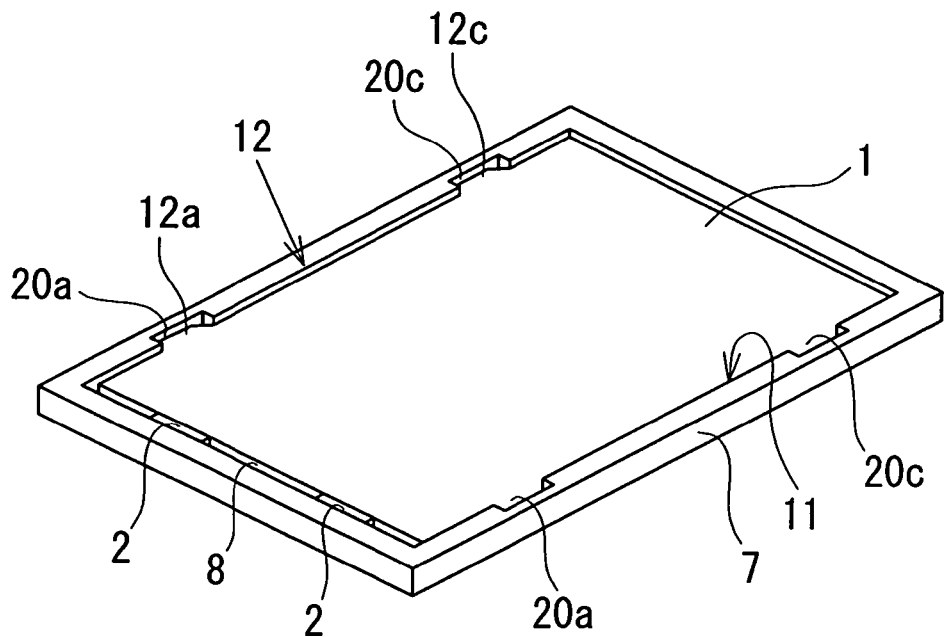
FIG. 9 is a perspective view of a relevant portion of a conventional spread illuminating apparatus, in which a light conductor plate is separate from a housing frame.
Figure 10:
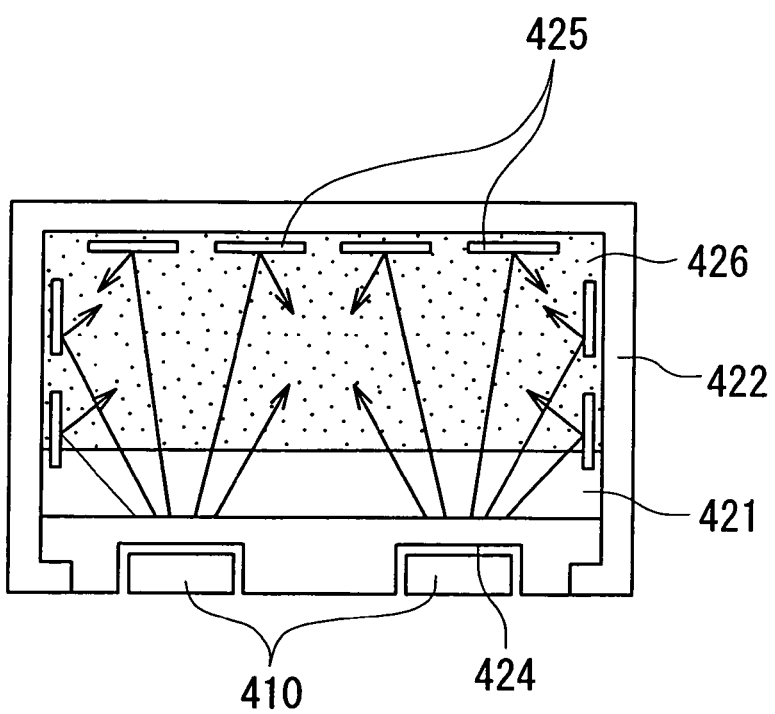
FIG. 10 is a schematic top view of a relevant portion of another conventional spread illuminating apparatus, in which a light conductor plate is integrated with a housing frame.

Referring to FIG. 8, when a gate G is positioned at an area of a side portion of the housing frame portion 24B opposite to the side portion having the opening 50, a plurality of resin flows f are generated to run taking paths shown by arrows. As shown in FIG. 8, the resin flows f are caused to run through gap areas provided between the slit 54 and the slits 56, 56 into the cavity segment for the light conductor plate portion 24A. The resin flows f introduced into the cavity segment for the light conductor plate portion 24A interfere with each other thereby forming weld lines to adversely effect on the optical properties of the light conductor plate portion 24A. In this connection, it is physically impossible, because of the slit 54 having a small thickness, to set an injection gate at the end of the slit 54 to thereby inject resin directly into the cavity segment for the light conductor plate portion 24A.

It is physically possible to set an injection gate at an area of the light conductor plate portion 24A located inside and close to the slit 54. This arrangement, however, results in that the gate is disposed in the effective portion of the light conductor plate portion 24A, and the cut trace of the gate thus disposed causes light to be scattered thus impairing brightness uniformity and also makes it difficult to meet the tolerance requirements specified for the thickness of the light conductor plate portion 24A.

Referring back to FIG. 7A, the area (indicated by hatching) to have the gate G is arranged such that a distance A defined from the opening 50 to the slit 52 is larger than a distance B defined from the outer side surface of the transparent resin plate 24 to the boundary between the light conductor plate portion 24A and the housing frame portion 24B. With such an arrangement, the clearance corresponding to the distance A through which resin is injected into the cavity segment for the light conductor plate portion 24A is large enough for a smooth movement of the resin flows f. In this connection, light emitted from the LED 42 housed in the opening 50 may partly leak through the clearance represented by the distance A but the leakage percentage is very small resulting in having no substantial negative influence on the brightness of the apparatus.

Since the area (indicated by hatching) to have the gate G is adjacent to the opening 50 which is disposed either at the center of the length of the side portion of the transparent resin plate 24 having the LED 42 or in the vicinity of the center, the gate G together with the clearance represented by the distance A is also positioned substantially at the center of the side portion, and resin can be directly and efficiently injected through the clearance into the middle of the cavity segment for the light conductor plate portion 24A as shown in FIG. 7A. Accordingly, it is prevented from happening that the plurality of resin flows f interfere with each other in the cavity segment for the light conductor plate portion 24A as shown in FIG. 8, and therefore no weld lines are formed in the light conductor plate portion 24A.

Further, since the light reflecting sheet 26 is attached to the rear of the transparent resin plate 24 such that the flap portions 26B, 26B, 26C and 26D, 26D of the light reflecting sheet 26 are inserted respectively in the slits 52, 52, 54 and 56, 56 of the transparent resin plate 24, the light reflecting sheet 26 can be reliably and precisely positioned with respect to the transparent resin plate 24. Also, the flap portions 26B, 26B, 26C and 26D, 26D of the light reflecting sheet 26 are inserted all the way through the slits 52, 52, 54 and 56, 56 located along the boundary between the light conductor plate portion 24A and the housing frame portion 24B of the transparent resin plate 24, and therefore are adapted to reflect substantially all the light emitted from the LED 42 and introduced in the light conductor plate portion 24A of the transparent resin plate 24, whereby the light is prevented from entering the housing frame portion 24B of the transparent resin plate 24 thus securely preventing the light from leaking from every part of the outer side surfaces of the transparent resin plate 24.

Also, since the opening 50 to house the LED 42 is a through hole positioned inside the outer side surface of the transparent resin plate 24, the LED 42 is located inside the outer side surface of the transparent resin plate 24, whereby light emitted from the LED 42 is duly introduced into the light conductor plate portion 24A enclosed by the flap portions 26B, 26B, 26C, 26D and 26D adapted to totally reflect the light introduced, thus also contributing to prevention of light leakage from the outer side surfaces of the transparent resin plate 24.

The present inventors made a comparison on central brightness, average brightness and brightness uniformity between the spread illuminating apparatus 22 having the light reflecting sheet 26 provided with the flap portions 26B/26B, 26C and 26D/26D according to the embodiment of the present invention versus a comparative example of a spread illuminating apparatus having a reflector equivalent to the light reflecting sheet 26 but without the flap portions 26B/26B, 26C and 26D/26D. The comparison results show that the central brightness, average brightness and brightness uniformity of the spread illuminating apparatus 22 versus the comparative example are: 2501 cd/m2 vs. 1938 cd/m2; 2442 cd/m2 vs. 1862 cd/m2; and 74.4% vs. 57.9%, respectively. Thus, it is verified that light leakage from the outer edge surfaces of the transparent resin plate 24 is effectively prevented in the spread illuminating apparatus 22.

What is claimed is:

1. A spread illuminating apparatus of side light type comprising:

a transparent resin plate integrally composed of a light conductor plate portion and a housing frame portion, wherein an opening is provided at a side portion of the transparent resin plate, slits are provided along a boundary between the light conductor plate portion and the housing frame portion, and wherein a gate for injecting resin for the transparent resin plate is positioned outside the boundary between the light conductor plate portion and the housing frame portion and is positioned also between the opening and one of slits which are provided toward the side portion of the transparent resin plate having the opening and which are located clear of the opening;

a light reflecting sheet which comprises a main body portion and flap portions extending from sides of the main body portion and bent up along the sides, and which is attached to a rear of the transparent resin plate with the flap portions inserted in the slits of the transparent resin plate; and a light source disposed in the opening of the transparent resin plate.

2. A spread illuminating apparatus according to claim 1, wherein a distance defined from the opening to the one slit provided toward the side portion having the opening is larger than a distance defined from the boundary with the one slit to an outer side surface of the side portion of the transparent resin plate having the opening.

3. A spread illuminating apparatus according to claim 1, wherein the opening is located either at a center of a length of the side portion of the transparent resin plate having the one slit or in a vicinity of the center.

4. A transparent resin plate adapted for use in a spread illuminating apparatus of side light type comprising: a light reflecting sheet disposed at a rear of the transparent resin plate and comprising a main body portion and flap portions extending from sides of the main body portion and bent up along the sides; and a light source disposed at a side of the transparent resin plat, wherein the transparent resin plate is integrally composed of a light conductor plate portion and a housing frame portion, the transparent resin plate comprising:
 an opening to house the light source, the opening disposed at a side portion of the transparent resin plate;
 slits provided along a boundary between the light conductor plate portion and the housing frame portion, wherein the light reflecting sheet is attached to the transparent resin plate with the flap portions inserted in the slits of the transparent resin plate; and
 a gate for injecting resin for the transparent resin plate, the gate positioned outside the boundary between the light conductor plate portion and the housing frame portion and positioned also between the opening and one of slits which are provided toward the side portion of the transparent resin plate having the opening and which are located clear of the opening.

5. A transparent resin plate according to claim 4, wherein a distance defined from the opening to the one slit provided toward the side portion having the opening is larger than a distance from the boundary having the one slit to an outer side surface of the side portion of the transparent resin plate having the opening.

6. A transparent resin plate according to claim 4, wherein the opening is located either at a center of a length of the side portion of the transparent resin plate having the one slit or in a vicinity of the center.

7. A method of injection-molding a transparent resin plate which is integrally composed of a light conductor plate portion and a housing frame portion and which is adapted for use in a spread illuminating apparatus of side light type comprising a light reflecting sheet disposed at a rear of the transparent resin plate and a light source disposed at a side of the transparent resin plate, wherein: the light reflecting sheet comprises a main body portion and flap portions extending from sides of the main body portion and bent up along the sides; an opening for housing the light source is provided at a side portion of the transparent resin plate; slits are provided along a boundary between the light conductor plate portion and the housing frame portion of the transparent resin plate; and the light reflecting sheet is attached to the transparent resin plate with the flap portions inserted in the slits of the transparent resin plate, the method comprising a step of injecting resin for the transparent resin plate into a cavity of a molding die through a gate positioned outside the boundary between the light conductor plate portion and the housing frame portion and positioned also between the opening and one of slits which are provided toward the side portion of the transparent resin plate having the opening and which are located clear of the opening.

8. A method of injection-molding a transparent resin plate according to claim 7, wherein a distance defined from the opening to the one slit provided toward the side portion of the transparent resin plate having the opening is larger than a distance defined from the boundary with the one slit to an outer side surface of the side portion of the transparent resin plate having the opening.

9. A method of injection-molding a transparent resin plate according to claim 7, wherein the opening is located either at a center of a length of the side portion of the transparent resin plate having the one slit or in a vicinity of the center.

* * * * *